(12) United States Patent
Isermann et al.

(10) Patent No.: US 6,446,018 B1
(45) Date of Patent: Sep. 3, 2002

(54) METHOD FOR COMPENSATING VARIATIONS OF A WHEEL SPEED SENSOR

(75) Inventors: Rolf Isermann, Seeheim; Peter Scheerer, Heppenheim; Oliver Nelles, Kronberg; Ralf Schwarz, Darmstadt, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/424,310
(22) PCT Filed: Apr. 18, 1998
(86) PCT No.: PCT/EP98/02303
§ 371 (c)(1), (2), (4) Date: May 12, 2000
(87) PCT Pub. No.: WO98/53329
PCT Pub. Date: Nov. 26, 1998

(30) Foreign Application Priority Data

May 23, 1997 (DE) ......................................... 197 21 488

(51) Int. Cl.⁷ ................................................ G01P 11/00
(52) U.S. Cl. .................................... 702/96; 702/145
(58) Field of Search .................... 702/96, 104, 105, 702/145; 701/70, 77; 73/1.37

(56) References Cited

U.S. PATENT DOCUMENTS

| | | | | |
|---|---|---|---|---|
| 5,020,008 A | * | 5/1991 | Chambers et al. | 377/30 |
| 5,210,692 A | * | 5/1993 | Fennel et al. | 303/139 |
| 5,297,028 A | * | 3/1994 | Ishikawa | 702/96 |
| 5,299,131 A | * | 3/1994 | Haas et al. | 180/197 |
| 5,305,241 A | * | 4/1994 | Hayashi et al. | 702/94 |
| 5,377,127 A | * | 12/1994 | Gibson et al. | 324/160 |
| 5,377,535 A | * | 1/1995 | Angermaier et al. | 324/207.25 |
| 5,541,859 A | | 7/1996 | Inoue et al. | |
| 5,864,775 A | * | 1/1999 | Bradshaw et al. | 702/104 |
| 6,016,465 A | * | 1/2000 | Kelly | 376/215 |
| 6,142,026 A | * | 11/2000 | Ohashi et al. | 701/37 |

FOREIGN PATENT DOCUMENTS

| | | |
|---|---|---|
| DE | 34 25 472 | 1/1986 |
| DE | 34 46 248 | 6/1986 |
| DE | 37 36 074 | 5/1988 |
| DE | 41 33 679 | 4/1993 |
| DE | 43 11 614 | 10/1993 |
| DE | 44 09 846 | 9/1994 |
| DE | 195 47 281 | 7/1996 |
| DE | 195 40 674 | 5/1997 |
| EP | 0 721 107 | 7/1996 |
| JP | 63 285469 | 11/1988 |

OTHER PUBLICATIONS

Search Report of the German Patent Office for Application No. 197 21 488.6.

* cited by examiner

Primary Examiner—Patrick Assouad
(74) Attorney, Agent, or Firm—Rader, Fishman & Grauer PLLC

(57) ABSTRACT

A method of compensating inaccuracies in a wheel speed sensor wherein signal-forming elements are arranged on a sensor wheel and wherein a determined angle is allocated to a given number of signal-forming elements to determine a wheel speed, and wherein the wheel speed is determined by evaluating the time during which the wheel rotates around the angle, wherein a correction factor which is included in the determination of the wheel rotational speed is memorized with respect to each element to compensate for variations of the signal-forming elements and/or the positioning of the elements, and the correction factors are updated during the driving operation, wherein updating is performed so that the non-corrected wheel speed measured by the sensor is compared with a reference value of the wheel speed established by means of a calculating model, and the correction factor is updated in dependence of this comparison.

5 Claims, 1 Drawing Sheet

METHOD FOR COMPENSATING VARIATIONS OF A WHEEL SPEED SENSOR

TECHNICAL FIELD

This invention relates to wheel speed sensors and more particularly relates to a method of compensating inaccuracies in a wheel speed sensor.

BACKGROUND OF THE INVENTION

A method of this type is disclosed in German patent application No. 44 09 846. In this application, an accurate value of the wheel rotational speed is required to conclude different wheel diameters and, under certain circumstances, pressure loss in individual wheels from variations of the wheel speeds of the individual wheels of a vehicle. The correction factors are established by determining the wheel speed from a full turn of the vehicle wheel under defined driving conditions which mainly include that no vehicle acceleration in the longitudinal or transverse direction can be detected. Subsequently, the correction factors of these individual partial intervals of the signal-forming elements are so adjusted that the wheel speeds, which are established due to the individual signal-forming elements in consideration of the correction factors, correspond to the wheel speed which resulted in a full turn of the wheel.

An object of the present invention is to improve the updating of the correction factors.

According to the present invention, this object is achieved by directly measuring non-corrected wheel speed and comparing it with a reference value of the wheel speed established by means of a calculating model, and updating the correction factor is updated dependence on this comparison.

Compared to the prior art method, it is favorable that the correction factors are updated considerably more quickly during driving than is the case in the prior art method. While in the prior art method updating is only possible when the defined driving conditions prevail, the method of the present invention permits updating in the current driving operation irrespective of what driving conditions are currently detected. On the one hand, the correction factors depend on manufacturing tolerances of the pole wheels and related differences in the distances of the individual signal-forming elements which should be equidistant in the optimal case. This concerns uneven tooth widths and tooth gap widths and, respectively, in active sensors, uneven distances of the magnets of the pole wheel of the sensor due to manufacturing tolerances. Further, the correction factors can be affected by deformations of the signal-forming elements which may occur during driving and due to the fact that metal chips may possibly gather in the interspaces between the signal forming elements. Likewise, corrosion of the signal-forming elements can be caused. Thus, uneven tooth and tooth gap widths or pulse periods of the pole wheel due to corrosion and/or contamination and mechanical damages are referred to. The last mentioned influences cause slow or sudden variations in the wheel rotational speed which should be taken into account as instantaneously as possible by updating the correction factors in order to have available in driving correct wheel rotational speed values as quickly as possible. This is important inasmuch as the wheel speed is the measured quantity for various vehicle safety systems. The signal-forming elements can be components of passive and active sensors.

Thus, the quicker updating of the correction factors achieved by the method of the present invention has favorable effects.

To minimize the effect of only brief variations of the measurement values on the correction factors, updating of the correction factors can be effected by producing the new correction factors in averaging the previously established correction factors and the current values. For example, this may be done by a recursive least-squares method, advantageously with a forgetting factor. It is achieved by the forgetting factor that 'old' values will no longer be taken into account after a defined period of time.

A first set of correction factors is acquired before the installation of the wheel speed sensor into a vehicle and is memorized in a control unit in the method of the present invention.

Favorably, this provides for a set of correction factors which can be updated correspondingly, simultaneously with the start of the first travel.

Preferably, the absolute position of the wheel is determined by way of a comparison of the sequence of the memorized correction factors with the sequence of currently established correction factors. This position can principally be newly determined every time a signal-forming element was detected. It is e.g. known from the state of the art to omit one tooth in a pole wheel and to identify the absolute position from the fact that when this location is passed by, the period between two signals is twice as long as the period between the other signals. In contrast thereto, no marking is necessary in the method of the present invention.

In a preferred method, the correction factors are stored one after the other, and the correction factor relating to each element is read out of the table in the determination of the wheel speed signal. When the end of the table is reached, the next correction factor at the beginning of the table is read out, and the elements are allocated to the correction factors by way of the determined absolute position.

Advantageously, the absolute position can be determined by way of the sequence of the established correction factors, and subsequently the correction factors can be read out of the table accordingly in a consecutive manner. It is possible to adjust the absolute position in the meantime. For example, this can be effected cyclically or when it is determined that the read-out correction factors differ by more than a defined amount from the currently established correction factors.

To determine the current position of the sensor wheel, the cross correlation of the established correction factors with the memorized correction factors is determined, and the absolute position of the sensor wheel is determined from value $\tau$ which corresponds to the maximum of the cross correlation. This is a relatively simple mathematical method which permits determining the absolute position of the pole wheel.

DETAILED DESCRIPTION OF THE PREFERRED EMBODIMENTS

Figure 1:
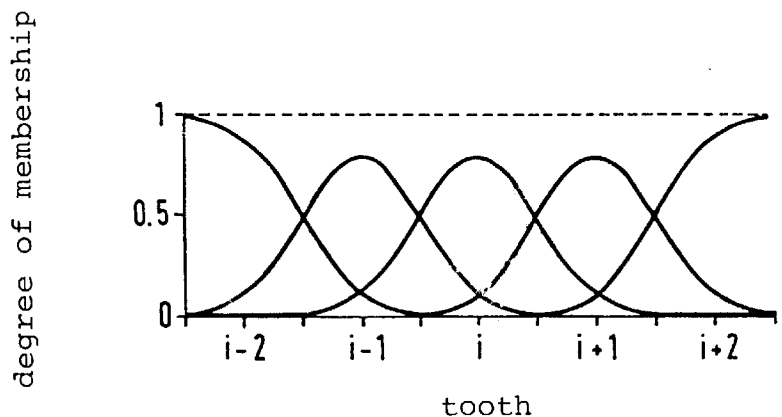
FIG. 1 is the representation of five standardized Gaussian functions.

Initially, the determination of the wheel speed according to the state of the art shall be explained. Accordingly, the determination of the wheel speed is based on a motion difference measurement between two objects (mostly wheel and wheel carrier) which move relative to each other. The time is measured which is required to stroke over a defined angle (determined by the teeth of the pulse wheel (pole wheel) in wheel speed sensors).

Thus, the wheel rotational speed $\omega_{wheel}$ can be calculated from the time t required for a determined angle φ as follows:

$$\omega_{wheel}=\phi/t$$

The precondition for an accurate speed acquisition with gate time measurement is an exact angular spacing of the pole wheel. Irregularities in the tooth/tooth gap widths or pulse periods take a direct influence on the speed measurement values. Therefore, the manufacturing tolerance for the pole wheel is of major importance to the signal accuracy. In addition, corrosion and contaminations can change the tooth widths and tooth gap widths or pulse periods. To achieve the measuring accuracy demanded in practical operations, an averaging over several tooth/tooth gap sequences or pulse periods is frequently applied in up-to-date systems depending on the rotational speed of the wheel. The speed information is thereby delayed, with the result of a deterioration of the control that is based on the speed signal.

As far as signal processing is concerned, the analog output signal $U_{sens}$ sent by the sensor in conventional speed sensors is mostly low-pass filtered ($U_{sens,filt}$) in the beginning and converted with a trigger unit into a square-wave signal ($U_{sens,TTL}$). The TTL square-wave signal is converted into a wheel speed by a gate circuit in in the control unit of the control system. However, this signal may be falsified due to the above-mentioned irregularities of the pole wheel.

The wheel speeds $\omega_{wheel}$ can be corrected ($\omega_{wheel,corr}$) by means of corresponding correction factors and submitted to the following units.

A quick determination of the correction factors is important because it permits determining the absolute position by way of the proposed correlation method in a very short time after standstill or falling below the 'sensor function speed' of the vehicle.

Due to the above-mentioned signal falsifications caused by the sensor wheel, which are due to irregularities of the pole wheel, it is important that these correction factors are updated sufficiently quickly during driving as well in order to be able to take into account effects due to damages, contamination and corrosion with a sufficient rapidity.

According to the present invention, the currently measured wheel speed is compared with a wheel speed value that was found by way of a calculating model, and updating of the correction factors is effected as a function of deviations of the measured wheel speed from the wheel speed value that was established by way of the calculating model.

The method of updating may e.g. be a recursive parameter estimation method with a forgetting factor. The reference speed can be determined, for example, by a fuzzy approach or a causal filtering.

Advantageously, the current pole wheel position can further be determined without a reference pulse at the pole wheel by means of a correlation analysis.

The deviation of the tooth/tooth gap widths or pulse periods from the respective nominal lengths causes systematical errors in the wheel speed calculation for the individual measuring points. These errors which are specific for the individual tooth/tooth gap sequences or pulse periods are equal for each revolution in the disturbance-free case. Thus, the following equation can be produced for the relative error of a speed information for each pulse period:

$$\epsilon=(\omega_{wheel,meas}-\omega_{wheel,actual})/\omega_{wheel,actual}.$$

In the fuzzy model, a compensation curve is plotted by the measured rotational speed variation which is given by respectively one speed measurement per tooth/tooth gap sequence. Because it is desired to minimize the calculating effort, a fuzzy model combined with a local linear estimation method is applied. The principle is as follows. Associated with each tooth is a standardized Gaussian function which can be interpreted as a membership function. The sum of the Gaussian functions is standardized equal to one, that means, if the number of teeth per revolution is $n_i$, the membership function $\Phi_i(j)$ for tooth number i is defined by $$\Phi_i(j)=z_j/\Sigma z_k,$$

and the summing is effected over all k from $(1-n_i/2)$ to $(1+n_i/2)$. The quantity $Z_k$ is defined as follows:

$$z_k=exp(-(j-k)^2/(2\sigma^2)).$$

Figure 2:
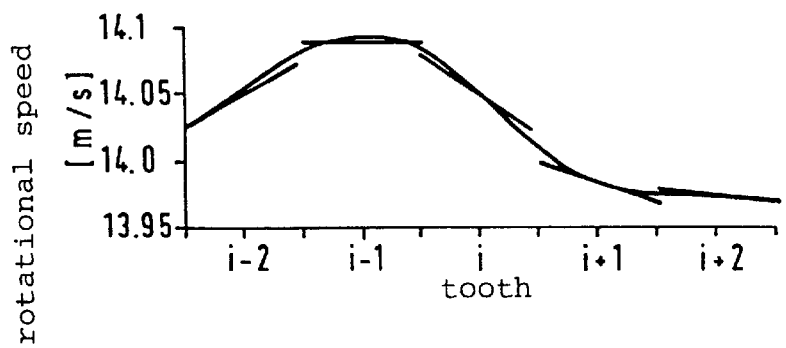
FIG. 2 is the representation of straight lines averaged by way of the membership functions.

FIG. 1 shows the representation of five standardized Gaussian functions, and FIG. 2 shows the representation of straight lines which were averaged by way of the membership functions. Because the tooth or pulse periods are not variable, they can be calculated a priori. To determine the compensation curve, a regression curve is plotted through the measuring data for each membership function. This regression curve represents a local speed estimation, its slope approximates the angular acceleration. The region of validity of each curve is determined by the associated Gaussian function. This Gaussian function is an indicator of the degrees of membership of the data. The entire compensation curve results from the weighted superposition of the regression curve.

The corrected wheel rotational speed can be computed pursuant to $$\omega=\Sigma(m_k\cdot(i-k)+b_k)\cdot\Phi_i(k) \quad (1).$$

Summing is effected over all values k from $(1-n_i/2)$ to $(1+n_i/2)$, with $m_k$ and $b_k$ as slopes of the curves and equal curve values. FIG. 2 shows this weighted averaging over the regression curve.

The number of the averaged measurement values can be influenced by suitably selecting the standard deviation σ. Because the regression curves have only local effects, the values $m_k$ and $b_k$ of the different straight lines can be estimated from the measured data irrespective of each other with only minor interpolation errors. Therefore, an estimation of two parameters ($m_k$ and $b_k$) is required for each newly measured rotational speed value. The optimal parameters $\Theta_i$ for the tooth number i are defined by the following weighted least-squares estimation:

$$\Theta_i=(\Psi_i^T W_i \Psi_i)^{-1}\Psi_i^T W_i y_i \quad (2).$$

with:

$$\Theta_i=(m_i b_i)^T \text{ and } y_i=(\omega_{wheel,meas,i-ni/2} \cdots (\omega_{wheel,meas,i+ni/2})^T$$

$$\Psi_i = \begin{vmatrix} i-n_i/2 & 1 \\ \cdots & \cdots \\ i+n_i/2 & 1 \end{vmatrix} \quad W = \begin{vmatrix} \Phi(i-n_i/2) & 0 & 0 \\ 0 & 0 & 0 \\ 0 & 0 & \Phi(i+n_i/2) \end{vmatrix} \quad (3)$$

Figure 3:
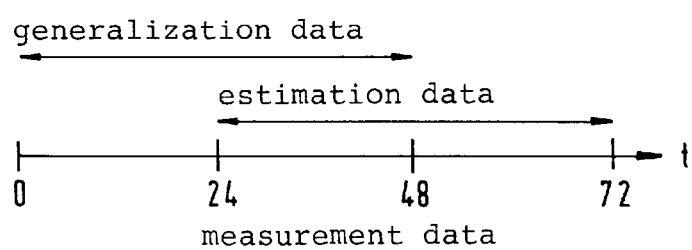
FIG. 3 is a representation of the allocation of the data for implementing the least-squares estimation and for calculating the corrected wheel speed for a pole wheel with 48 teeth/pulses.

Because only two parameters must be estimated for each tooth, it is possible to calculate $\Theta_i$ (pursuant to (2)) very quickly. In order to provide the wheel speed calculated pursuant to (1) and (2) in due time for the evaluation, the data is divided as shown in the embodiment of FIG. 3. FIG. 3 shows the division of the data for the estimation pursuant to equation (2) and for the calculation pursuant to equation (1) for a pole wheel with 48 teeth or pulses.

The parameters of the tooth which is half a revolution in the past are estimated pursuant to (2) from the data of the last revolution. The data older by half a revolution is used to calculate the speed signal for the tooth which is one revolution in the past pursuant to equation (1). Such a procedure is favorable because the estimation of parameters requires data on the right and the left, on the one hand, and the calculation of the rotational speed preconditions already estimated parameters on the right and the left, on the other hand. Thus, per pulse period, exactly one parameter vector with two parameters is estimated pursuant to equation (2) and the pertinent rotational speed is calculated for one tooth.

One alternative possibility of calculating a compensation curve based on the measured rotational speeds includes an a causal digital filtering of the signals. The basic difference over the approach mentioned hereinabove is that exclusively speed values are available during filtering at the discretely measured points of time, while a compensation curve produces a continuous signal variation.

Advantageously, the filter is a causal to avoid a systematical error by a phase shift introduced by the filter. An a causal filtering can be achieved very easily by a forward and a subsequent backward filtering of the data by means of a causal filter, for example. Therefore, this method also requires data on both sides of the tooth for which the averaged rotational speed shall be calculated.

The following equation (4) shows the approach for a causal digital filter in respectively one direction:

$$G_F(z)=(b_0+b_1z^{-1}+\ldots+b_mz^{-m})/(1+a_1z^{-1}+\ldots+a_nz^{-n}) \quad (4)$$

The parameters $a_i$ und $b_i$ are used to control the filtering order and the filter time constant.

Both approaches described hereinabove have parameters to be adjusted. In the fuzzy approach, the standard deviation of the membership functions and the limit frequency in the filter can be determined. These parameters are appropriate to make both methods resolution-adaptive, i.e., to adapt the resolution depending on the driven speed. It is desired in practical operations that a defined frequency range of the rotational speed can just about be measured. Thus, depending on the rotational speed, a different number of measurement values corresponds to the shortest vibration period that can be evaluated. Consequently, a proportional correlation between the standard deviation of the membership functions or the filter time constants and the rotational speed is appropriate. One advantage of the fuzzy approach is the possibility of calculating a continuous reference speed and its first derivative for each tooth.

The above stated equation for each relative error $\epsilon$ of a tooth or a tooth gap permits calculating a relative rotational speed error $\epsilon_j$ which renders possible a correction of the wheel speed values measured in the following revolutions according to the equation hereinbelow:

$$\omega_{wheel,corr,i}=v_j \cdot \omega_{wheel,meas,i}, v_j=1/(1+\epsilon_j) \quad (5).$$

The index j of the error $\epsilon_j$ or of the correction factor $v_j$ runs from one to the number of teeth per pole wheel revolution $n_j$. For the measured wheel speed values $\omega_{wheel,corr,i}$ or the corrected speed values $\omega_{wheel,corr,i}$ the index i beginning with the start of the travel is incremented by one with each measurement value.

Because the formation of reference rotational speeds during driving represents only an approximation for the actual wheel speed (e.g. due to road disturbances, changes in the dynamic tire radius caused by wheel load variations, or similar effects), it is appropriate to average the correction factors over several revolutions. To this end, the correction factors are calculated by a recursive least-squares method.

Initially, the correlation between the reference speed and the measured speed is configured in the following general way:

$$y_i=\Psi_i{}^*\Theta_j \quad (6),$$

with the meaning:

$\Theta_j=v_j$ $\Psi_i=\omega_{wheel,meas,i}$ $y_i=\omega_{wheel,ref,i}$

Because only one parameter must be estimated per pulse period and the measurement vector includes only the measured wheel speed, the equation (6) is a scalar equation. Likewise, a scalar correlation is achieved for the recursive estimation equation (7):

$$\Theta_j(k+1)=\Theta_j(k)+\gamma_i(k)(y_i(k+1)-\Psi_i(k+1)\Theta_j(k)) \quad (7)$$

In order to take into account the time-variant property of the tooth-tooth gap errors which are due to corrosion, contaminations or mechanical damages on the pole wheel during driving maneuvers, a recursive least-squares method with a forgetting factor $\gamma$ inferior to one is employed.

The compensation factor $\gamma_i(k)$ of the recursive least-squares method (RLS) is hence computed:

$$\gamma_i(k)=P_i(k)\Psi_i(k+1)/(\Psi_i(k+1)P_i(k)\Psi_i(k+1)+\lambda) \quad (8)$$

The standardized estimation value $P_i(k)$ of the covariance of the parameter estimation error in equation (8) is produced from:

$$P_i(k+1)=(1/\lambda)\cdot(1-\gamma_1(k)\Psi_i(k+1))P_i(k) \quad (9)$$

The so calculated correction factors $v_j$ for the wheel speed values are memorized in a table and updated after each new estimation.

When the rotational speed falls below a defined threshold, the passive sensors will no longer provide a reliable indication of the rotational speed. It happens frequently in normal road traffic conditions that the correction factors stored in a table do no longer permit being associated definitely with the teeth/magnets of the sensor (for example, also after a standstill of the vehicle). Favorably, the method can be so configured that an association of this kind is quickly possible.

Initially, new correction factors are established for the first wheel revolution after a loss in association (for example, due to a standstill of the vehicle). These correction factors, compared to the stored correction factors, have a poor quality because they originate from only one measurement operation. Nevertheless, they come very close to the characteristics of the memorized correction factors. When correlating the memorized correction factors with the newly measured ones, the correlation function will exhibit its maximum, with the number of teeth $n_v$ by which the table and measurement are offset.

This number of teeth can be calculated pursuant to the following equation:

$$n_v=\max(\text{corr}(\iota)) \quad (10)$$

By finding this maximum the table can be synchronized with the new measurements. The reliability of this method can be increased as desired by evaluating several wheel revolutions to the disadvantage of the speed of association.

It shall be explained in the following how the problem of the limitation of the data available for the correlation estimation can be solved advantageously because the end of the table is reached.

The correlation is computed pursuant to the following equation:

$$(\text{corr}(\iota)=(1/n_i)\cdot\Sigma v_{j,memorized}\cdot v_{j+\iota,new,measured} \qquad (11).$$

The summation is effected for all j from 1 to $n_i$.

Values $n_i$ are available for the calculation of corr(0), however, only one value is available for the calculation of corr($n_i$). The result is an estimation of the correlation for great values of $\iota$ which is not reliable. This problem can be overcome in an elegant way by making use of the periodicity of the measurements. The principal characteristics of the measurement is repeated with each wheel revolution. Therefore, in (11) the index $(j+\iota-n_i)$ can be used for all $v_{j+\iota,new,measured}$ with $j+\iota > n_i$ instead of $(j+\iota)$. Thus, two data rings instead of two data strings are correlated to each other. This procedere provides $n_i$ measured values for each value of $\iota$. A reliable correlation estimation and, thus, synchronization is thereby rendered possible.

Figure 4:
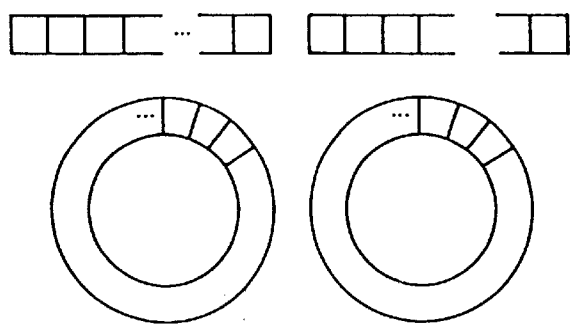
FIG. 4 is a principle view of the correlation of the corresponding data.

The embodiment of FIG. 4 shows a graph of these conditions.

Thus, corrected speed information can be procured from a just measured speed value, and the correction value is taken from a table in the memory of a sensor signal evaluating unit. The correction factors are respectively associated with a tooth or a tooth/tooth gap sequence or, respectively, a magnet or a magnet area.

As explained hereinabove, it is possible to produce the reference speed by a fuzzy approach or by filtering.

In a favorable aspect, the parameters (standard deviation of the fuzzy approach or parameters of the filter) can be adjusted as a function of the wheel rotational speed in order to attenuate speed-independent disturbances of the angular speed signal above a defined frequency.

What is claimed is:

1. Method of compensating inaccuracies in a wheel speed sensor, wherein signal-forming elements are arranged on a sensor wheel and wherein a determined angle is associated with a given number of signal-forming elements to determine a wheel speed, and wherein the wheel speed is determined by evaluating the time during which the wheel rotates around the angle, wherein a correction factor which is included in the determination of the wheel speed is memorized with respect to each element to compensate for variations of the signal-forming elements and/or the positioning of the elements, and the correction factors are updated during the driving operation, wherein updating is performed so that the non-corrected wheel speed measured by the sensor is compared with a reference value of the wheel speed established by means of a calculating model, and the correction factor is updated in dependence on this comparison, comprising the steps of:

establishing the reference value by way of a calculating model which is based on at least one of an a causal or causal filtering approach having parameters which are adjusted in dependence on the wheel speed so that a defined frequency range of the wheel speed can be measured.

2. Method as claimed in claim 1, wherein an absolute position of the wheel is determined by way of a comparison of the sequence of the memorized correction factors with the sequence of currently established correction factors.

3. Method as claimed in claim 2, wherein the correction factors are stored one after the other in a table, and the correction factor relating to each element is read out of the table in the determination of the wheel speed signal, and when the end of the table is reached, the next correction factor at the beginning of the table is read out, and in that the elements are allocated to the correction factors by way of the determined absolute position.

4. Method as claimed in claim 2, determining the cross correlation of the newly established correction factors with the memorized correction factors, and wherein the absolute position of the sensor wheel is determined by finding the maximum of the cross correlation.

5. Method of compensating inaccuracies in a wheel speed sensor, wherein signal-forming elements are arranged on a sensor wheel and wherein a determined angle is associated with a given number of signal-forming elements to determine a wheel speed, and wherein the wheel speed is determined by evaluating the time during which the wheel rotates around the angle, wherein a correction factor which is included in the determination of the wheel speed is memorized with respect to each element to compensate for variations of the signal-forming elements and/or the positioning of the elements, and the correction factors are updated during the driving operation, wherein updating is performed so that the non-corrected wheel speed measured by the sensor is compared with a reference value of the wheel speed established by means of a calculating model, and the correction factor is updated in dependence on this comparison, comprising the steps of:

establishing the reference value by way of a calculating model wherein a compensation relationship curve is defined through the measured wheel speed variation and a membership function is associated with each signal-forming element, defining a regression relationship through the measurement data for each membership function, and establishing the reference value of the wheel speed by superposition of the regression relationship which is weighted with the membership functions, and adjusting the membership functions, in dependence on the wheel speed, so that a defined frequency range of the wheel speed can be measured.

* * * * *

UNITED STATES PATENT AND TRADEMARK OFFICE
CERTIFICATE OF CORRECTION

PATENT NO.   : 6,446,018 B1
DATED        : September 3, 2002
INVENTOR(S)  : Rolf Isermann et al.

It is certified that error appears in the above-identified patent and that said Letters Patent is hereby corrected as shown below:

<u>Column 8,</u>
Line 2, change "one of an a causal" to -- one of an acausal --.

Signed and Sealed this

Eleventh Day of February, 2003

JAMES E. ROGAN
*Director of the United States Patent and Trademark Office*